(12) United States Patent
Speer et al.

(10) Patent No.: US 7,008,502 B2
(45) Date of Patent: Mar. 7, 2006

(54) METHOD AND APPARATUS FOR JOINING SUBSTRATES

(75) Inventors: Ulrich Speer, Eisingen (DE); Roland Wagner, Bretten (DE); Stephan Leonhardt, Bretten (DE)

(73) Assignee: STEAG HamaTech AG, (DE)

( * ) Notice: Subject to any disclaimer, the term of this patent is extended or adjusted under 35 U.S.C. 154(b) by 374 days.

(21) Appl. No.: 10/250,793

(22) PCT Filed: Dec. 13, 2001

(86) PCT No.: PCT/EP01/14662

§ 371 (c)(1),
(2), (4) Date: Jul. 8, 2003

(87) PCT Pub. No.: WO02/054398

PCT Pub. Date: Jul. 11, 2002

(65) Prior Publication Data

US 2004/0050485 A1 Mar. 18, 2004

(30) Foreign Application Priority Data

Jan. 8, 2001 (DE) .............................. 101 00 427

(51) Int. Cl.
*G11B 7/26* (2006.01)
*B29C 65/00* (2006.01)
*B29C 65/48* (2006.01)

(52) U.S. Cl. ...................... 156/285; 156/286; 156/381; 156/382; 156/538

(58) Field of Classification Search ................ 156/285, 156/286, 312, 381, 382, 538, 556
See application file for complete search history.

(56) References Cited

U.S. PATENT DOCUMENTS

| 5,183,547 A | * | 2/1993 | Ikeda ..................... 204/298.25 |
| 5,766,407 A | * | 6/1998 | Miwa et al. ................ 156/382 |
| 6,136,168 A |   | 10/2000 | Masujima et al. |
| 6,254,716 B1 | * | 7/2001 | Russell et al. .............. 156/286 |
| 6,337,003 B1 | * | 1/2002 | Kinokiri et al. ........ 204/298.15 |
| 6,702,540 B1 | * | 3/2004 | Olin ........................... 414/217 |

FOREIGN PATENT DOCUMENTS

DE          197 15 779         10/1998

(Continued)

*Primary Examiner*—John T. Haran
*Assistant Examiner*—Jayme L. Brown
(74) *Attorney, Agent, or Firm*—Robert W Becker & Associates; Robert W Becker (57) ABSTRACT

In order to reduce cycle times for assembling at least two substrates (3,4) in order to form an optical data carrier in a low-pressure chamber (8), a method and a device are disclosed wherein an opening (11) of the low-pressure chamber is sealed in relation to the surrounding environment, the low-pressure chamber is pumped out, a transfer chamber (64) is formed between a first handling device (16) arranged in the low-pressure chamber and a second handling device (24) arranged outside the low-pressure chamber by respectively sealing the opening (11) of the low-pressure chamber (8). The transfer chamber (64) has a smaller volume than that of the low-pressure chamber (8); the substrates (3, 4) in the transfer chamber (64) are transferred from the second handling device (24) to the first handling device (16); the substrates are conveyed (3, 4) with the first handling device (16) to an assembly station (14) in the low-pressure chamber when low-pressure chamber is sealed by the second handling device (24), and the substrates (3,4) are assembled in the assembly station (14).

9 Claims, 3 Drawing Sheets

FOREIGN PATENT DOCUMENTS

| | | |
|---|---|---|
| DE | 199 27 514 | 12/2000 |
| DE | 100 29 400 | 1/2001 |
| EP | 0 449 227 | 10/1991 |
| EP | 0 463 392 | 1/1992 |
| EP | 1 029 942 | 8/2000 |
| WO | WO 97/36738 | 10/1997 |

* cited by examiner

METHOD AND APPARATUS FOR JOINING SUBSTRATES

BACKGROUND OF THE INVENTION

The present invention relates to a method and to an apparatus for joining at least two substrates together to form a data carrier.

Known as data carriers, are, for example, CDs, DVDs, DVRs, FMDs, etc. which comprise at least two substrates that are glued together.

Pursuant to one known apparatus for the manufacture of such data carriers, as is known, for example, from DE-A-100 29 400, that originates with the same applicant, the substrates are glued together by means of a double-sided adhesive film. In a laminating station, the double-sided adhesive film is applied to a first one of the substrates, and subsequently the laminated substrate is placed upon a receiving unit having a centering and holding pin. A second substrate is also placed upon the receiving unit, whereby the two substrates are held spaced from one another by the centering and holding pin. Subsequently, the receiving unit is moved into an assembly station having a hood, which is moved into contact with the receiving unit in order to form between them a closed chamber. In this position, the chamber is pumped out via a non-illustrated device in order during the subsequent joining together of the substrates to prevent air bubbles between them. When a specified underpressure is reached in the chamber, a ram or presser that is moveably disposed in the chamber is moved in order to press the substrates together.

With this method, it is necessary, prior to the joining together of substrates, to pump the chamber from ambient pressure to a desired underpressure, resulting in relatively long cycle times for the joining together of the substrates.

Proceeding from this state of the art, it is therefore an object of the present invention to provide a method and apparatus for the joining of at least two substrates together to form an optical data carrier, pursuant to which the cycle times for the joining together can be shortened.

SUMMARY OF THE INVENTION

Pursuant to the present invention, this object is realized with a method for the joining of at least two substrates together, to form a data carrier, in a low-pressure chamber that has at least one opening for the introduction and/or removal of substrates, with the following method steps: sealing off the opening relative to the surroundings; pumping out the low-pressure chamber; forming a transfer station between a first handling device disposed in the low-pressure chamber and a second handling device disposed externally of the low-pressure chamber by respectively sealing off the opening of the low-pressure chamber, whereby the transfer chamber has a smaller volume than does the low-pressure chamber. Transferring the substrates from the second handling device to the first handling device in the transfer chamber; transporting the substrates with the first handling device to an assembly station in the low-pressure chamber, with the low-pressure chamber being sealed off by the second handling device; joining the substrates together in the assembly station.

Pursuant to the inventive method, the low-pressure chamber is initially brought to a desired underpressure that is kept essentially constant during and between successive joining-together processes. The respective pumping out of the assembly station for each individual joining together can be eliminated, thereby considerably reducing the cycle times. The underpressure in the low-pressure chamber can be kept constant since the transfer chamber between the first and second handling devices has a considerably smaller volume than the volume of the low-pressure chamber, and thus during the opening of the transfer chamber to the low-pressure chamber only slight pressure fluctuations occur. Furthermore, at every point in time the opening of the low-pressure chamber is sealed off relative to the surroundings by the first and/or second handling device, so that pressure fluctuations occur only during the opening of the transfer chamber.

Pursuant to one preferred embodiment of the invention, the transfer chamber is pumped out prior to and/or during the substrate transfer in order to still further reduce the pressure fluctuations in the low-pressure chamber. In this connection, it is not necessary for the pressure in the transfer chamber to be reduced to the pressure in the low-pressure chamber; rather, the pressure in the transfer chamber is pumped out to a pressure that lies between the ambient pressure and the pressure in low-pressure chamber. The pumping out of the transfer chamber is preferably limited to a time span that is necessary for the substrate transfer between the handling devices in order to optimize the cycle times.

To enable a simultaneous transfer of substrates at the opening and a joining together of further substrates in the assembly station, the first handling device preferably has at least two receiving means that are controlled in such a way that one receiving means carries the substrates during the joining together, while the other receiving means seals off the opening of the low-pressure chamber.

The first handling device is preferably brought into contact with the assembly station to form a joining chamber. The joining chamber is preferably pumped out to a pressure that lies below the pressure in the low-pressure chamber. In this way, it is not necessary to pump out the low-pressure chamber to the underpressure required for the joining process; rather, it is sufficient to bring the chamber to a pressure between the ambient pressure and the underpressure required for the joining process. Since the low-pressure chamber is already brought to an underpressure, the required pumping out times for the joining chamber are considerably reduced relative to the state of the art, where the joining chamber must always be brought from the ambient pressure to the underpressure required for the joining processes.

Pursuant to the invention, the object is also realized by an apparatus for joining at least two substrates together to form a data carrier, which apparatus has a low-pressure chamber having at least one opening for the introduction and/or removal of substrates, as well as a device for pumping out the low-pressure chamber, an assembly station in the low-pressure chamber, a first handling device for the carrying and transport of the substrates in the low-pressure chamber, the handling device being moveable from within into a position that seals off the opening, and a second handling device for the carrying and transport of the substrates externally of the low-pressure chamber, the second handling device being moveable from the outside into a position that seals off the opening. In this way there result the already aforementioned advantages that the opening for the introduction and/or removal of the substrates can always be sealed off by the first or second handling device, so that the pressure within the chamber can be kept essentially constant.

In their sealing positions, the handling devices preferably form an essentially closed transfer chamber having a volume that is smaller than the volume of the low-pressure chamber, so that when the transfer chamber is open to the low-pressure chamber only slight pressure fluctuations occur. To reduce the pressure fluctuations still further, a device is provided for pumping out the transfer chamber.

To enable a simultaneous joining together of substrates and an introduction and removal of further substrates into or out of the chamber, the first handling device has at least two substrate receiving means. The substrate receiving means each preferably have a housing having a U-shaped cross-section in order to enable a good chamber formation with the second handling device. For a good chamber formation, the second handling device preferably also has a housing having a U-shaped cross-section, as well as a moveable substrate holder.

To prevent the substrates from unintentionally coming into contact, the first and second handling devices carry the substrates in a spaced-apart manner prior to their being joined together.

For the formation of a joining chamber, the first handling device is preferably moveable into contact with the assembly station. Furthermore, a device for pumping out the joining chamber is advantageously provided.

Pursuant to an alternative embodiment of the invention, the apparatus has at least one further opening for the introduction and/or removal of substrates, whereby the first handling device is moveable into a position that seals off the further opening, and the apparatus has at least three substrate receiving means, and whereby at least one third handling device is provided for carrying and transporting the substrates externally of the low-pressure chamber, the handling device being moveable into a position that seals off the further opening. By means of the second opening, substrates can be simultaneously introduced into and removed from the low-pressure chamber, thereby reducing the cycle times still further.

The invention will be described in greater detail subsequently with the aid of preferred embodiments and with reference to the figures.

BRIEF DESCRIPTION OF THE DRAWINGS

Shown are.

DESCRIPTION OF PREFERRED EMBODIMENTS

Figure 1:
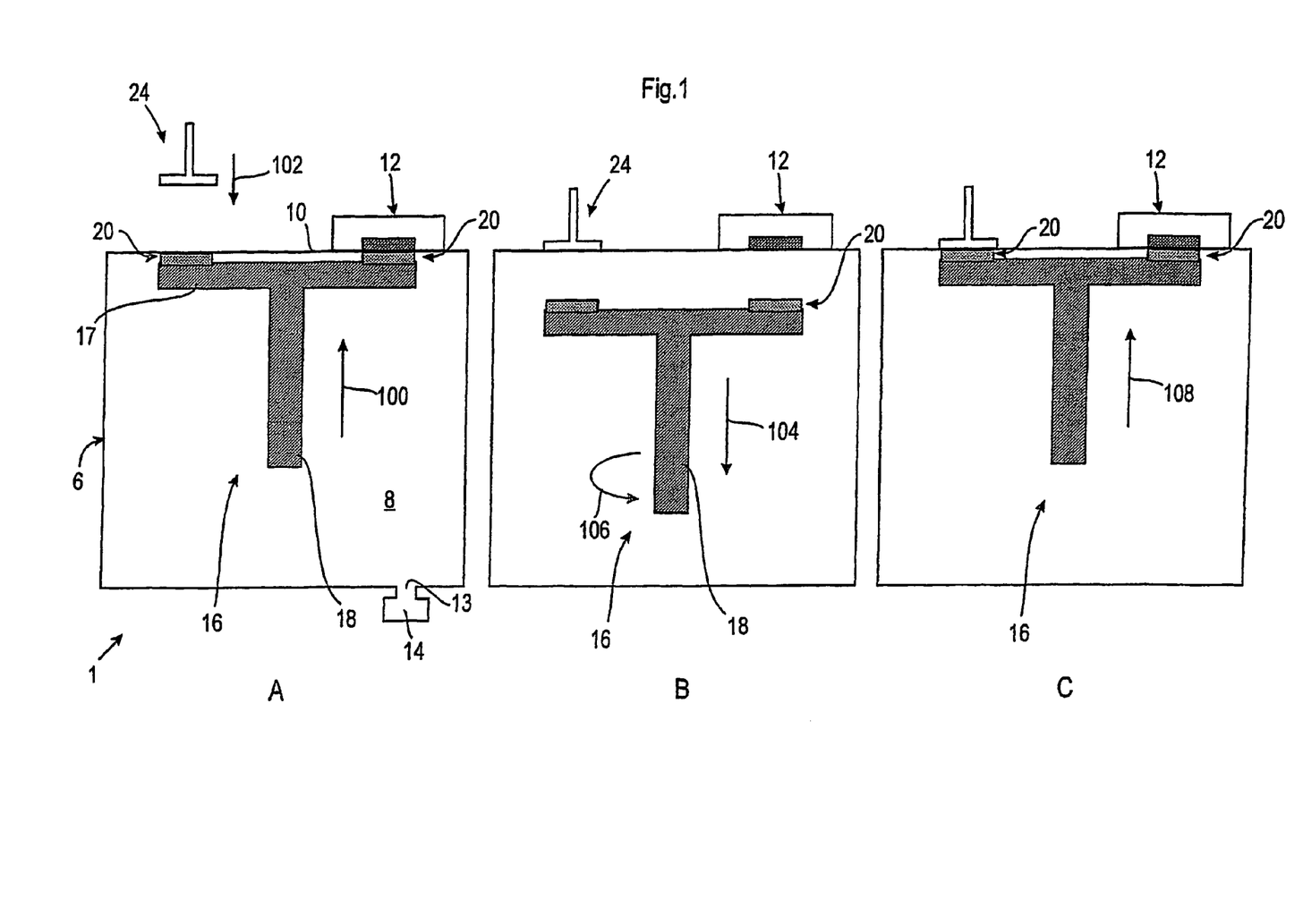
FIGS. 1A to C a schematic illustration of one inventive apparatus for the assembly of data carriers, as well as a process cycle for the joining of the substrates.
Figure 2:
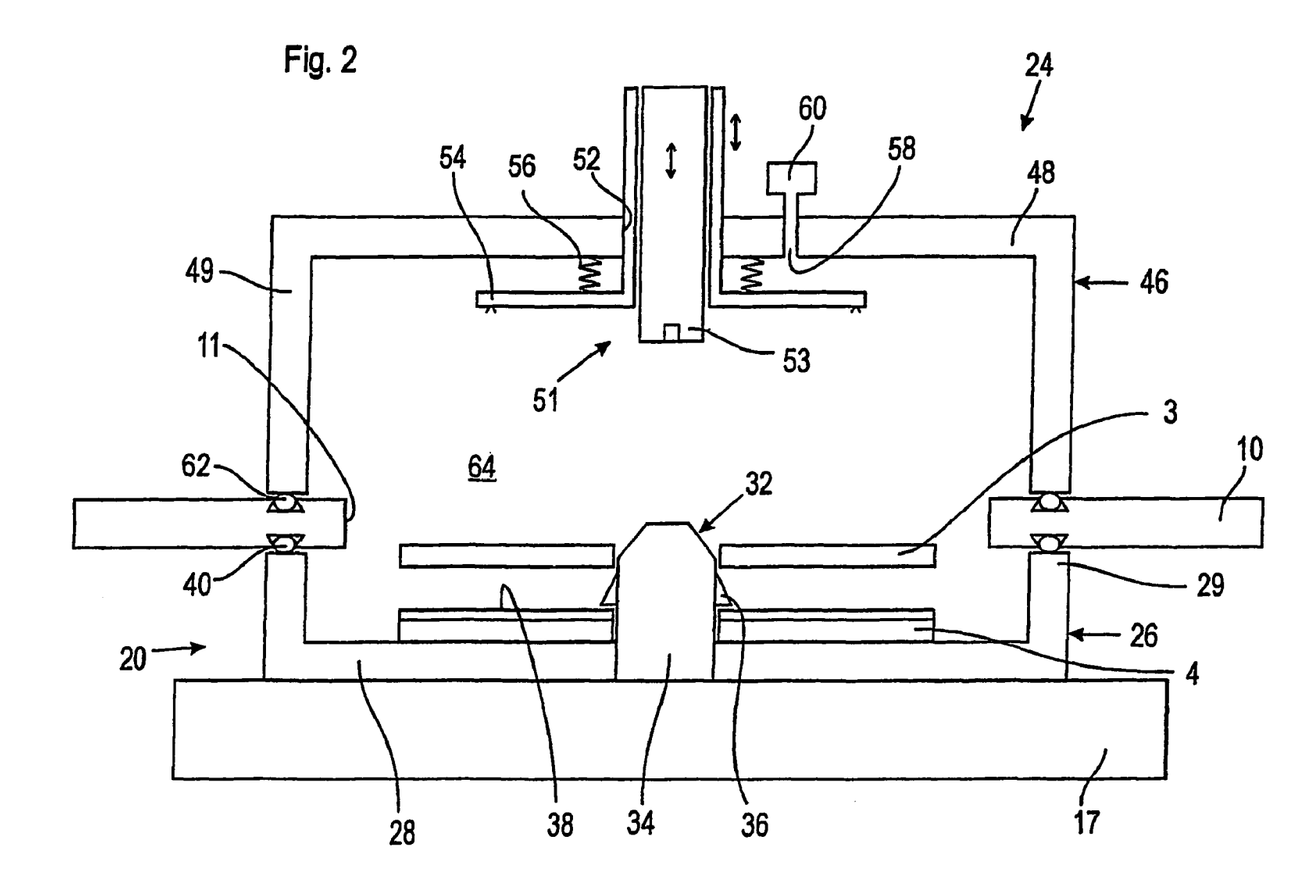
FIG. 2 a schematic cross-sectional view of a transfer chamber formed by first and second handling devices.

The FIGS. 1A to C schematically show an inventive apparatus 1 for the joining together of substrates 3, 4, which are visible in FIG. 2.

The apparatus 1 has a housing 6 that in the interior forms a vacuum or low-pressure chamber 8. An opening or passage 11 is provided in an upper wall of the housing 6, as can be best seen in FIG. 2. Furthermore provided on the upper wall 10 is an assembly station 12, which will be described in greater detail subsequently with reference to FIG. 3.

Provided in the base of the housing 6 is an exhaust line 13, which is connected with a suction device 14, such as a vacuum pump, to enable a pumping-out of the low-pressure chamber 8 to a prescribed value.

A first handling device 16, in the form of a rotary table, is provided in the low-pressure chamber 8. The rotary table 16 has a plate 17, which extends essentially horizontally, as well as a rotary shaft 18 that extends perpendicular thereto. The plate 17 extends parallel to the upper wall 10 of the housing, and is moveable toward it and away from it via the shaft 18. Furthermore, the plate 17 is rotatable about the axis of rotation of the shaft 18.

Provided on the plate 17 are two substrate receiving means 20 that face toward the upper wall 10 of the housing 6; the two substrate receiving means have the same construction, and will described in greater detail subsequently with reference to FIG. 2.

Provided above the upper wall 10 of the housing 6 is a second handling device 24, which is suited for the delivery and transport-away of substrates. The handling device 24 is provided with suitable axes of movement for the transport of the substrates, and can be moved from the outside against the upper wall 10 of the housing 6 in order to seal off the opening 11 in the upper wall 10 of the housing 6 relative to the surroundings, as will be described in greater detail subsequently with reference to FIG. 2.

With the aid of FIG. 2, the more detailed construction of one of the substrate receiving means 20, as well as of the second handling device 24, will now be described.

FIG. 2 shows one substrate receiving means 20 of the handling device 16 that is disposed upon the plate 17 of the rotary table. The substrate receiving means 20 is provided with a housing 26 having an essentially U-shaped cross-section, and that is mounted in a suitable manner on the plate 17. The housing 26 can, of course, also be integrally or monolithically formed with the plate 17. The housing 26 has a base wall 28 as well as a circumferential side wall 29.

A centering and holding pin 32 is accommodated in the base wall 28 and is suited for centering the substrates 3, 4 and for keeping them spaced from one another. The centering and holding pin has, for example, a construction such as that known from DE-A-199 27 514, which originates with the same applicant and to which reference is made in order to avoid repetition. The centering and holding pin 32 has a central pin portion 34, the outer periphery of which is adapted to the inner holes of the substrates 3, 4. Provided on the pin portion are noses 36 that are moveable radially relative to the pin and upon which the substrates can rest. By means of a non-illustrated movement mechanism, the noses 36 can be moved radially toward the pin so that the substrates 3, 4 can move downwardly along the pin. Due to the linear outer surfaces of the noses 36, the substrates 3, 4 are guided in a precisely centered manner during this movement. It can be seen in FIG. 2 that a first substrate 4 has moved past the noses 36 of the centering and holding pin 32, and rests upon the base wall 28 of the housing 26. A second substrate 3 rests upon the noses 36 and in so doing is held parallel to, and spaced from, the lower substrate 4.

It is to be understood that in place of the centering and holding pin 32, the substrate receiving means 20 could also be provided with some other suitable mechanism that is in a position to receive the substrates 3, 4 and keep them spaced from one another, such as, for example, a pin having moveable balls, spring washers, or the like.

As can be seen in FIG. 2, there is provided on the lower substrate 4 a double-sided adhesive film 38 that was previously applied in a laminating station, as is known, for example, from DE-A-100 29 400, which originates with the same applicant and to which reference is made in order to avoid repetition.

The radial side wall 29 of the housing 26 has inner dimensions that are greater than the dimensions of the opening 11 in the upper wall 10 of the housing 6. This makes it possible to seal-off the opening 11 from the side of the low-pressure chamber 8 when the side wall 29 is moved into contact with the upper wall 10 of the housing 6. To ensure a good seal, a sealing means 40, such as an O-ring, is provided in the upper wall 10 of the housing 6; the sealing means radially surrounds the opening 11 and provides a reliable sealing contact with an end face of the side wall 29 of the housing 26. Of course, an appropriate sealing element can also be provided on or in the end face of the side wall 29 in order to provide a good seal with the upper wall of the housing 6.

The handling device 24 also has a housing 46 having a U-shaped cross-section and an upper wall 48 and a circumferential side wall 49. A substrate holder 51, which is in a position to receive and deposit two substrates independently of one another and to keep them spaced from one another, extends through an opening 52 in the upper wall 48. The substrate holder 51 is, for example, provided with a combination of an inner hole gripper 53 and an external gripper 54 in the form of a vacuum gripper, as is known, for example, from DE-A-198 18 479, which originates with the same applicant. The inner hole gripper 53 and the external gripper 54 are moveable relative to one another and relative to the housing 46 via suitable, non-illustrated movement mechanisms along an axis of movement that extends perpendicular to the upper housing wall 48.

In order to seal off the opening 52 in the upper wall 48 of the housing 46, a sealing device 56, for example a bellows, extends between a back side of the external gripper 54 and an inner side of the upper wall 48.

Furthermore provided in the upper wall 48 is an exhaust opening 58 that communicates with a suction device 60, such as a vacuum pump.

The side wall 49 of the housing 46 is moveable from the outside against the upper wall 10 of the housing 6 in order to seal off the opening 11 relative to the surroundings. To improve the seal, there is provided in the upper wall 10 of the housing 6 a sealing means 62, such as an O-ring. Of course, a suitable sealing element can also be provided on or in an end face of the side wall 49 in order to provide a seal between the housing 46 and the upper wall 10 of the housing 6.

If the first and second handling devices 16, 24, i.e., the housings 26 and 46 respectively thereof, as illustrated in FIG. 2, are moved into contact with the upper wall 10, there is formed between the two handling devices a sealed-off transfer chamber 64. The transfer chamber can be pumped out via the exhaust opening 58 and the vacuum pump 60. The volume of the transfer chamber 64 is considerably less than the volume of the low-pressure chamber 8, as a result of which when the transfer chamber 64 is opened to the low-chamber 8, only slight pressure fluctuations occur in the low-pressure chamber, which can be rapidly compensated for by the vacuum pump 14. This is particularly applicable if, prior to being opened to the low-pressure chamber 8, the transfer chamber 64 is pumped out via the vacuum pump 60 to a pressure that is between the ambient pressure and the pressure existing in the low-pressure chamber 8, as will be described in greater detail subsequently.

Figure 3:
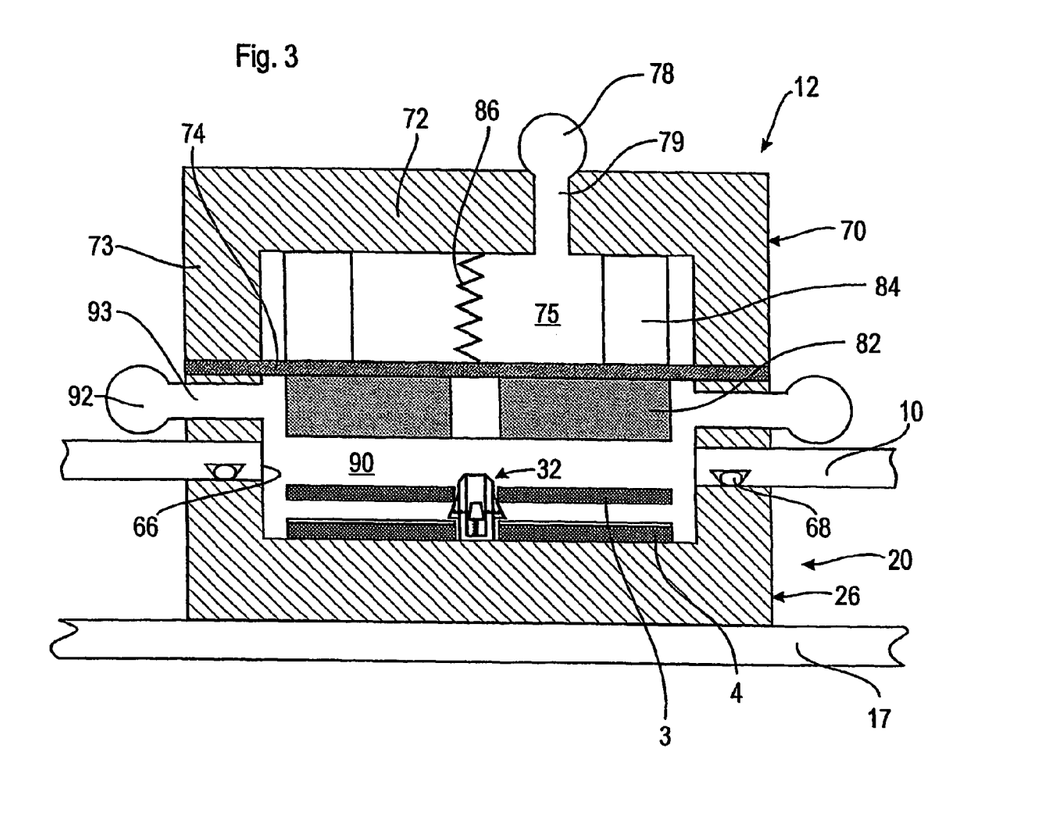
FIG. 3 a schematic cross-sectional view of an assembly station.

FIG. 3 shows the presently preferred assembly station 12, which is mounted on the upper wall 10 of the housing 6. In the region of the assembly station 12, the upper wall 10 of the housing 6 is provided with an opening 66. The assembly station 12 has a lower portion that is formed by the substrate receiving means 20 described in conjunction with FIG. 2. During an assembly or joining-together process, the substrate receiving means 20, as is illustrated in FIG. 3, is moved from the inside against the upper wall 10. A sealing element 68, such as an O-ring, in the upper wall 10 radially surrounds the opening 66 and faces the low-pressure chamber, and provides a good seal between the housing 26 and the upper wall 10. An upper portion of the assembly station 12 is formed upon the outer side of the upper wall 10. This upper portion has a housing 70 having a U-shaped cross-section. The housing 70 has an upper wall 72 as well as a circumferential side wall 73 that radially surrounds the opening 66 in the wall 10 of the housing 6. The side wall 73 is connected in a sealing manner with the upper wall 10 of the housing 6.

Provided in the housing 70 is a flexible membrane 74 that completely spans the interior of the housing 70 and thereby forms a closed-off air chamber 75 on that side of the flexible membrane 74 that faces away from the low-pressure chamber 8.

The air chamber 75 is subjected to underpressure or partial vacuum via a suction device 78 and an appropriate conduit 79 in the upper wall 72 of the housing 70.

A plate 82, which faces the low-pressure chamber 8, is mounted in a suitable manner on the membrane 74, so that the plate 82 is moveable along with the flexible membrane 74.

Counter supports 84 are provided in the air chamber 75 to limit an upward movement of the membrane 74, and the plate 82 mounted thereon, i.e. into the air chamber 75.

By means of a spring 86, which extends between the upper wall 72 and the membrane 74, the membrane 74 is preloaded against the counter supports 84. The force of the spring 86 is such that upon pressure equilibrium above and below the membrane, the spring lightly draws the membrane against the counter supports 84 in order to hold it in the position shown in FIG. 3. Some other preloading device can, of course, also be provided in order to hold the membrane 74, and the plate 82 mounted thereon, in the position shown in FIG. 3.

The region disposed below the membrane 74 forms, together with the substrate receiving means 20, a joining chamber 90. The joining chamber 90 can be subjected to underpressure or partial vacuum via a suction device 92, for example a vacuum pump, and an appropriate line 93 in the side wall 73 of the housing 70 in order to reduce the pressure within the joining chamber 90 to below the pressure in the low-pressure chamber 8.

The function of the assembly station 12 will now be briefly described in conjunction with FIG. 3. First, the substrate receiving means 20 is moved into the position shown in FIG. 3 in order together with the external housing 70 to form the joining chamber 90. At this point in time, the same pressure exists in the joining chamber 90 as in the low-pressure chamber 8. The pressure in the air chamber 75 is similarly at or below the pressure of the low-pressure chamber in order to ensure that the membrane 74 and the plate 82 are in the position shown in FIG. 3. The pressure in the joining chamber 90 is now reduced still further by means of the suction device 92. The pressure in the air chamber 75 is also further reduced to the extent that this is necessary in order to ensure that the pressure in the joining chamber 90 is not lower than the pressure in the air chamber 75, as a result of which the membrane 74 is held in the position shown in FIG. 3.

When the desired underpressure in the joining chamber 90 is achieved that prevents air bubbles between the substrates, the pressure in the air chamber 75 is raised in a controlled manner to ambient pressure. As a consequence of the thereby-resulting pressure difference between the chamber 75 and the lower pressure in the joining chamber 90, the membrane 74, with the plate 82 mounted thereon, is deflected downwardly in a controlled manner, as a result of which the plate first comes into contact with the upper substrate 3 and subsequently presses the latter against the substrate 4 disposed below it. As a result of the floating mounting of the plate 82 on the membrane 74, there results a good adaptation of the plate 82 to the support, i.e. the lower wall 28 of the housing 26, disposed below the substrate, so that a uniform compression force is applied over the substrate.

The pressure in the chamber 75 is subsequently reduced further, while the pressure in the joining chamber 90 is again raised to the pressure in the low-pressure chamber 8, so that the membrane 74, with the plate 82 mounted thereon, is moved back into the raised position shown in FIG. 3. At this point in time, the joining process is concluded. Alternatively, the described membrane station can also be provided in the substrate receiving means, so that the substrate is floatingly mounted and is pressed against a stationary plate for the joining-together.

With the aid of FIGS. 1A to C, the operation of the apparatus 1 for the joining of substrates together will be described in greater detail subsequently.

The handling device 16 is first moved upwardly, as illustrated by the arrow 100. The two substrate receiving means 20 are, as a result, moved from within against the upper housing wall 10, and in particular in such a way that they radially surround the openings 11 and 66 and seal them from within. The low-pressure chamber 8, which is sealed relative to the surroundings, is now brought to a desired underpressure via the suction device 14, and is subsequently held at this underpressure. The movement of the substrate receiving means 20 against the housing wall can also be effected by a relative movement between the plate 17 and the substrate receiving means 20. The handling device 24 is moved from the outside against the upper wall 10 of the housing 6 into the position shown in FIG. 2, as illustrated by the arrow 102, so that the opening 11 is sealed from the outside against the surroundings. A transfer chamber 64 is formed between the housing 26 of the substrate receiving means 20 and the housing 46 of the handling device 24; the transfer chamber is evacuated by the suction device 60 to a pressure that lies between the ambient pressure and the pressure in the low-pressure chamber 8. Two substrates that are to be joined together are transferred from the substrate holder 51 of the handling device 24 to the substrate receiving means 20, and in particular in such a way that the substrates are held spaced from one another prior to, during and after the transfer.

After the substrates have been accommodated in the substrate receiving means 20, the handling device 16 is lowered, as illustrated by the arrow 104 in FIG. 1B. Due to the fact that the handling device 24 seals the opening 11 in the upper wall 10 of the housing 6 from the outside, the pressure in the low-pressure chamber is prevented from rising significantly. It is merely necessary to compensate for a slight pressure difference, which results from the transfer chamber 64 being opened to the low-pressure chamber 8. Due to the considerably lower volume of the transfer chamber 64 relative to the low-pressure chamber 8, and due to the fact that the transfer chamber 64 is at least partially pumped out, the pressure in the low-pressure chamber is, however, essentially constant. In the lowered position, the plate 17 is rotated with the substrate receiving means 20 about the rotary shaft 18 by 180 degrees, as illustrated by the arrow 106 in FIG. 1B.

As a result, the just loaded substrate receiving means 20 is positioned below the assembly station 12, while the substrate receiving means 20 that was previously positioned below the assembly station 12 is positioned below the opening 11. The handling device 16 is raised, as illustrated by the arrow 108 in FIG. 1C. The substrate receiving means 20 with the loaded substrates, which are held spaced from one another, is moved into the position shown in FIG. 3, and the substrates are joined together, as was described with reference to FIG. 3.

At the same point in time, the other substrate receiving means 20 seals the opening 11 from within, as shown in FIG. 2. To the extent that an optical data carrier assembled from two substrates is disposed in this substrate receiving means, this data carrier can be received by the handling device 24 and transported away. Since the opening 11 is now sealed relative to the surroundings from the inside, no pressure drop results in the low-pressure chamber 8 when the handling device 24 is moved away from the opening 11. New substrates can now be loaded into the substrate receiving means 20, as was described with reference to FIG. 1A.

The foregoing description clearly shows that the low-pressure chamber 8 need be pumped-out only one time from the ambient pressure to a prescribed underpressure, and can then be held essentially constant at the prescribed underpressure, since the opening 11 in the upper wall 10 of the housing 6 is always sealed off by the first and/or the second handling device.

Although the invention was described with the aid of preferred embodiments, it should be noted that it is not limited to the concretely illustrated embodiments. In particular, it is not necessary that the handling device 24 be provided with a combination of an inner hole gripper and external gripper. Rather, any substrate holder can be utilized that is capable of supporting the substrates that are to be joined together in a manner spaced from one another and to transfer them to the substrate receiving means 20. The shape of the centering and holding pin 32 of the substrate receiving means 20 can also deviate from the illustrated shape. It is only important that the substrates be held spaced from one another prior to being joined together. The configuration of the assembly station 12 can also deviate from the illustrated configuration. For example, instead of a floatingly mounted plate 82, a non-floatingly mounted presser can also be used to join the substrates together. The substrates can also be joined together by the stroke movement of the substrate receiving means in the direction of the assembly station. In this case, the joining chamber would be eliminated, and the assembly station would be provided only with a suitable abutment for the substrate receiving means. The inventive apparatus is especially suitable for the production of conventional optical data carriers such as, for example, CDs, DVDs and DVRs. However, it is also suitable for new storage media, such as, for example, FMDs, which contain fluorescing media in a plurality of layers. Furthermore, it is not necessary for each of the handling devices to have a housing having a U-shaped cross-section. Rather, the handling devices can also have a flat cover plate, whereby the necessary transfer chamber is formed by the thickness of the upper wall and/or crosspieces or elements mounted thereon.

The specification incorporates by reference the disclosure of German priority document 101 00427.3 filed 08 Jan. 2001 and PCT/EP01/14662 filed 13 Dec. 2001.

The present invention is, of course, in no way restricted to the specific disclosure of the specification and drawings, but also encompasses any modifications within the scope of the appended claims.

What is claimed is:

1. A method of joining at least two substrates together, to form a data carrier, in a low-pressure chamber that has at least one opening for an introduction and/or removal of substrates, said method including the steps of:

sealing off said at least one opening relative to surroundings;

pumping out said low-pressure chamber;

respectively sealing off said at least one opening of said low-pressure chamber (8) to form a transfer chamber between a first handling device disposed in said low-pressure chamber and a second handling device disposed externally of said low-pressure chamber, wherein said transfer chamber has a smaller volume than does said low-pressure chamber;

transferring substrates in said transfer chamber from said second handling device to said first handling device, wherein prior to and/or during said substrate transfer said transfer chamber is pumped out to a pressure that is greater than a pressure in said low-pressure chamber;

transporting substrates with said first handling device to an assembly station in said low-pressure chamber, wherein said low-pressure chamber is sealed off by said second handling device;

bringing said first handling device into contact with said assembly station to form a joining chamber;

pumping out said joining chamber to a pressure that is less than a pressure in said low-pressure chamber; and joining substrates together in said assembly station.

2. A method according to claim 1, wherein said first handling device is provided with at least two substrate receiving means, wherein one of said substrate receiving means carries the substrates during the joining together, and the other substrate receiving means seals off said at least one opening of said low-pressure chamber from the inside relative to the surroundings.

3. An apparatus for joining at least two substrates together to form a data carrier, comprising:

a low-pressure chamber having at least one opening for an introduction and/or removal of substrates;

a device for pumping out said low-pressure chamber;

an assembly station provided in said low-pressure chamber;

a first handling device for carrying and transporting substrates in said low-pressure chamber, wherein said first handling device is moveable into a position that seals off said at least one opening, and wherein said first handling device is moveable into contact with said assembly station to form a joining chamber;

a second handling device for carrying and transporting substrates externally of said low-pressure chamber, wherein said second handling device is moveable into a position that seals off said at least one opening, and wherein said first and second handling devices, when in their opening-sealing positions form an essentially closed-off transfer chamber (64) having a volume that is less than a volume of said low-pressure chamber;

a device for pumping out said transfer chamber; and a device for pumping out said joining chamber.

4. An apparatus according to claim 3, wherein said first handling device is provided with at least two substrate receiving means.

5. An apparatus according to claim 4, wherein each of said substrate receiving means has a housing having a U-shaped cross-section.

6. An apparatus according to claim 3, wherein said second handling device has a housing having a U-shaped cross-section.

7. An apparatus according to claim 6, wherein a substrate holder is moveably disposed in said housing.

8. An apparatus according to claim 3, wherein said first and second handling devices carry said substrates in such a manner that they are spaced apart prior to being joined together.

9. An apparatus according to claim 3, wherein at least one further opening is provided for an introduction and/or removal of substrates, wherein said first handling device is moveable into a position that seals off said further opening, wherein at least three substrate receiving means are provided, and wherein at least one further handling device is provided for a carrying and transporting of substrates externally of said low-pressure chamber, said further handling device being moveable into a position in which it seals off said further opening.

* * * * *

UNITED STATES PATENT AND TRADEMARK OFFICE
CERTIFICATE OF CORRECTION

PATENT NO. : 7,008,502 B2
DATED : March 7, 2006
INVENTOR(S) : Speer et al.

It is certified that error appears in the above-identified patent and that said Letters Patent is hereby corrected as shown below:

<u>Title page,</u>
Item [54], Title, should read:
-- METHOD AND APPARATUS FOR JOINING SUBSTRATES TOGETHER --.

Signed and Sealed this

Sixteenth Day of May, 2006

JON W. DUDAS
*Director of the United States Patent and Trademark Office*